Patented Jan. 4, 1927.

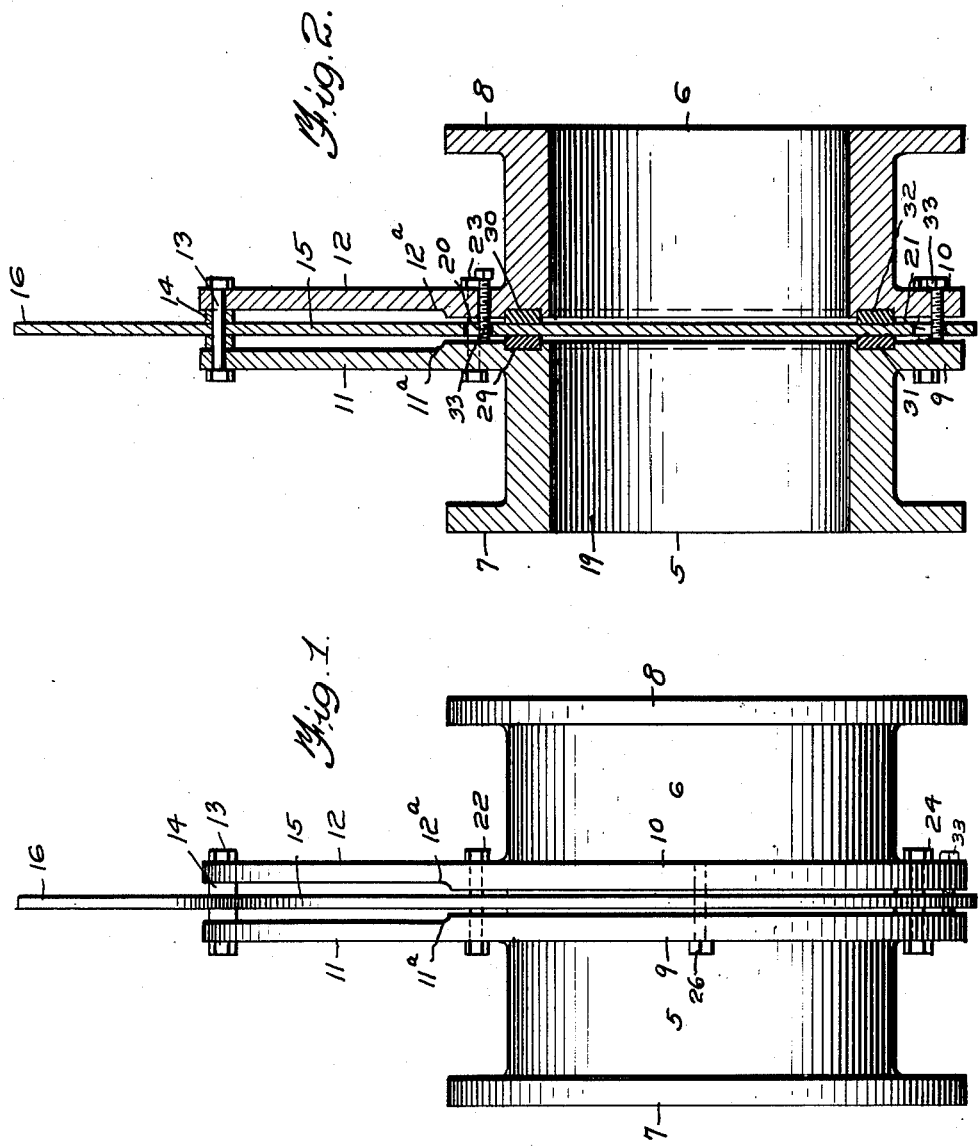

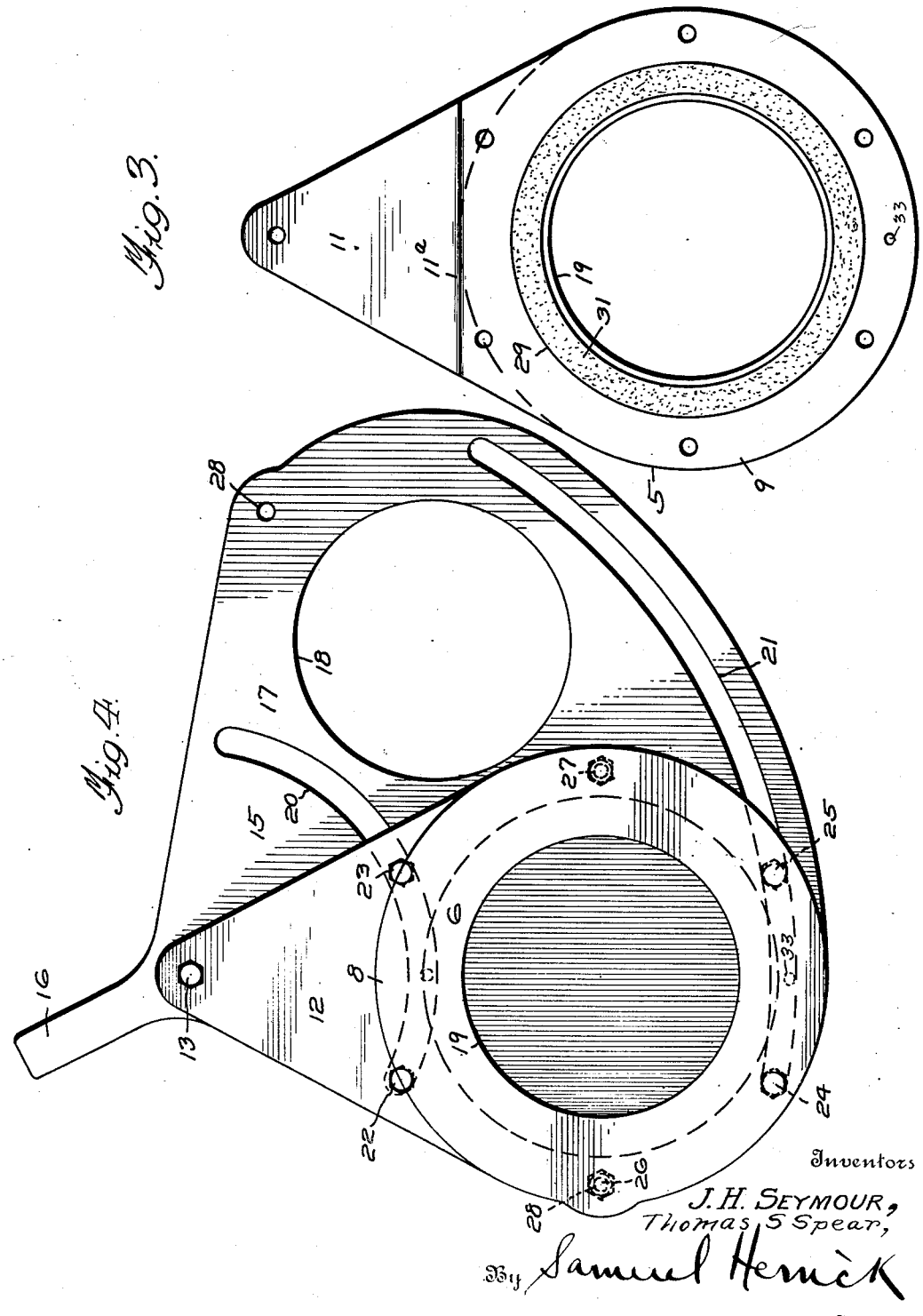

1,613,138

UNITED STATES PATENT OFFICE.

JULIUS H. SEYMOUR AND THOMAS S. SPEAR, OF BARTOW, FLORIDA.

GATE VALVE.

Application filed July 20, 1926. Serial No. 123,704.

This invention relates to gate valves and it has for its object to provide an improved structure of this character of such a nature that when in its opened position the passage through the valve will be fully opened and not obstructed by any part of the valve mechanism.

While the gate valve of the present invention is of general application and is adapted for use in many relations it is of particular value in dredging pipe lines and like places where regular gate valves can not be used. In dredging pipe lines and phosphate mine rock lines the excessive amount of sand in the lines cuts the valves and gets into the groove where the gate works, making it impossible to close the valve. Consequently it has been found necessary to employ blind gaskets in these lines to close them. It is the primary object of the present invention to provide a gate valve which can be satisfactorily used under the conditions recited.

In the accompanying drawings—

Fig. 1 is a side elevation of a valve constructed in accordance with the invention.

Fig. 2 is a vertical sectional view therethrough.

Fig. 3 is a longitudinal face view of one half of the valve casing with the valve removed.

Fig. 4 is an end elevation of the valve with the valve in open position.

Like numerals designate corresponding parts in all of the figures of the drawing.

The valve casing comprises the two similar sections 5 and 6, carrying flanges as indicated at 7 and 8, to adapt them to be connected into a pipe line. The confronting faces of the sections are provided with flanges 9 and 10, which carry the projecting portions 11 and 12. These projecting portions are connected by a bolt 13, which constitutes a pivotal mounting for the hub 14 of the swinging valve 15. This valve comprises the operating extension 16 which projects outwardly beyond the bolt 13. The valve is in the form of a plate 17 and has an opening 18 formed therethrough to correspond in diameter to the bore 19 of the valve. The extensions 11 and 12 are cut away as indicated at 11ª and 12ª to provide complete clearance for the valve between said extensions. The valve plate is provided with arcuate slots 20 and 21 and cap screws 22 and 23 pass through slot 20 and cap screws 24 and 25 pass through slot 21. Cap screws 26 and 27 are adapted to pass through openings 28 of the plate 17, only one of said openings being shown.

The confronting faces of the flanges 9 and 10, are counterbored as indicated at 29 and 30, for the reception of annular gaskets 31 and 32.

When the valve is to be moved with respect to the casing to open or close the same, the four cap screws 22, 23, 24 and 25 are loosened and the cap screws 26 and 27 are removed. Set screws 33 are tightened and the valve is swung to its open or closed position as desired after which set screws 33 are loosened; cap screws 26 and 27 are replaced and cap screws 22, 23, 24 and 25 are tightened. Set screws 33 act merely as thrust elements to force the sections 5 and 6 slightly apart and to relieve pressure on the valve and permit it to move easily.

Thus it will be seen that the valve of the present invention comprises, in effect, a two part casing having a swinging valve plate operating therebetween together with means for drawing the two parts of the casing into forceful engagement with said plate, after the latter has been moved to its open or closed position to thereby bind the two parts of the casing upon the valve plate and to effect a fluid tight joint between these parts. A structure of this nature will operate satisfactorily to quickly open or close a line of pipe no matter how much sand or other foreign matter may be carried therein. In this respect it is superior to anything with which we are familiar.

It is to be understood that the invention is not limited to the precise construction set forth but that it includes within its purview whatever changes come within either the terms or the spirit of the appended claims.

Having described our invention what we claim is:

1. A structure of the character described comprising a pair of valve casing sections, a valve plate mounted to swing therebetween having an opening formed therein adapted to align with the bore of the valve casing sections, arcuate slots formed in said valve plate and draw bolts traversing the valve casing sections for drawing them toward each other, said draw bolts passing through said arcuate slots.

2. A structure as recited in claim 1 in combination with additional draw bolts which pass through the valve casing sections and through the valve plate to hold the valve plate against movement as long as the said draw bolts are in place.

3. A structure of the character described comprising a pair of valve casing sections, a valve plate mounted to swing therebetween having an opening formed therein adapted to align with the bore of the valve casing sections, arcuate slots formed in said valve plate and draw bolts traversing the valve casing sections for drawing them toward each other, said draw bolts passing through said arcuate slots, portions carried by the valve casing sections and extending laterally beyond the line of the valve casing sections, a pivot for the valve plate carried by said portions and an actuating lever formed of an extension of the valve plate beyond said pivot.

In testimony whereof they affix their signatures.

JULIUS H. SEYMOUR.
THOMAS S. SPEAR.